United States Patent [19]

Banks

[11] Patent Number: 4,702,361

[45] Date of Patent: Oct. 27, 1987

[54] CLUTCH AND RELEASE BEARING ASSEMBLY

[75] Inventor: John D. Banks, Leamington Spa, England

[73] Assignee: Automotive Products plc, Leamington Spa, England

[21] Appl. No.: 866,406

[22] Filed: May 23, 1986

[30] Foreign Application Priority Data

May 24, 1985 [GB] United Kingdom ............... 8513234

[51] Int. Cl.[4] .............................................. F16D 19/00
[52] U.S. Cl. .................................... 192/98; 192/99 S; 192/111 A
[58] Field of Search ............ 192/110 B, 111 A, 70.13, 192/70.25, 99 S, 98, 89 R, 18 R, 70.27, 99 A

[56] References Cited

U.S. PATENT DOCUMENTS

| | | | |
|---|---|---|---|
| 1,415,841 | 3/1922 | Seitz | 192/70.2 |
| 1,988,748 | 1/1935 | Pearman | 192/70.25 |
| 3,376,964 | 4/1968 | Root | 192/111 A |
| 3,752,286 | 8/1973 | Sink | 192/111 A |
| 3,866,733 | 2/1975 | Linn et al. | 192/111 A |
| 3,868,006 | 2/1975 | Linn et al. | 192/111 A |
| 3,876,049 | 4/1975 | Linn et al. | 192/111 A |
| 4,109,773 | 8/1978 | Higgerson et al. | 192/111 A |
| 4,445,600 | 5/1984 | Schmidt | 192/18 R |
| 4,579,203 | 4/1986 | Link | 192/15 |

FOREIGN PATENT DOCUMENTS

| | | |
|---|---|---|
| 3229052 | 2/1984 | Fed. Rep. of Germany . |
| 2244939 | 4/1975 | France . |
| 2332457 | 6/1977 | France . |
| 1544814 | 4/1979 | United Kingdom . |
| 2096262A | 10/1982 | United Kingdom . |

*Primary Examiner*—John E. Murtagh
*Assistant Examiner*—Andrew Joseph Rudy
*Attorney, Agent, or Firm*—Solon B. Kemon

[57] ABSTRACT

The assembly includes a first sleeve connected to a releasing mechanism of a clutch and having a screw threaded surface. A second sleeve is movable relative to the first sleeve and is operatively connectable to a release member. A collar is in threaded engagement with the first sleeve and clutch release forces are transmitted through the collar from the second sleeve to the first sleeve. The collar is prevented from rotating relative to the first sleeve during clutch release. An abutment is provided on the clutch for releasing the collar when the second sleeve reaches a predetermined position to allow the collar to rotate and allow the first sleeve to move axially relative to the second sleeve. A spring for urging the second sleeve towards the clutch acts between the second sleeve and part of the abutment on the clutch. A locking ring may be provided for locking the collar to the second sleeve during clutch release.

26 Claims, 5 Drawing Figures

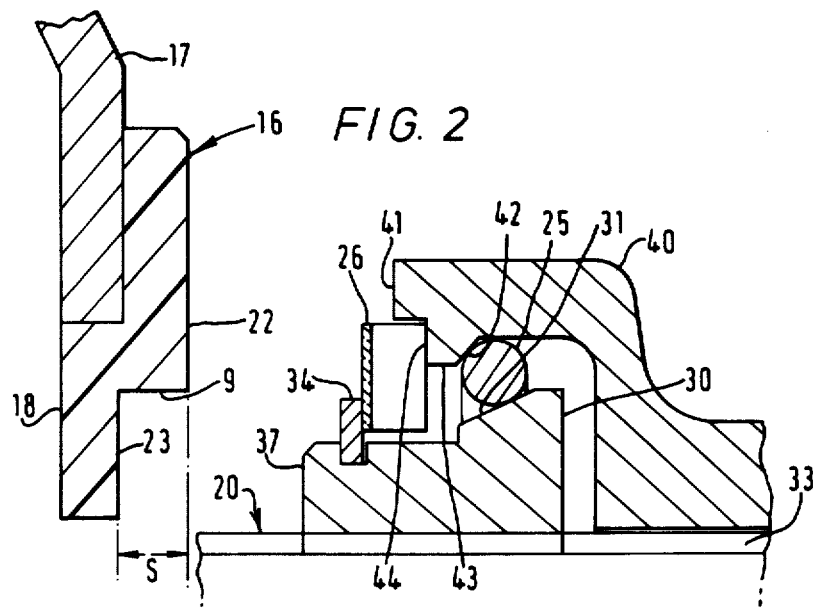
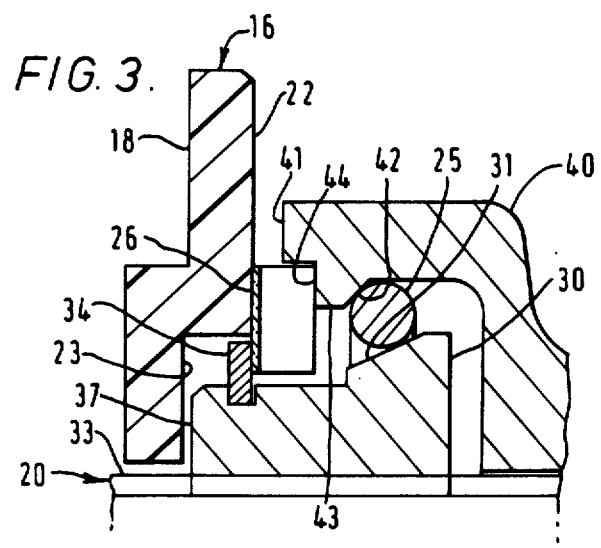

CLUTCH AND RELEASE BEARING ASSEMBLY

BACKGROUND OF THE INVENTION

This invention relates to a clutch and release bearing assembly and in particular to an assembly in which an adjuster mechanism is included to compensate for wear in the clutch.

It is known from GB No. 1544814 to provide a release bearing assembly for a clutch in which an adjuster mechanism is provided to compensate for wear of the clutch. In GB No. 1544814 the assembly comprises a first member operatively connected to releasing means of the clutch and having a screw threaded surface, a second member movable relative to the first member and being operatively connectable to an operator controlled release member, an element in threaded engagement with the first member and through which clutch release forces are transmitted from the second member to the first member, said element being prevented from rotating relative to the first member during clutch release, abutment means on the clutch for releasing the element when the second member reaches a predetermined position to allow the element to rotate relative to the first member thereby allowing the first member to move axially relative to the second member, and resilient means for urging the second member towards the clutch. However, the resilient means urges the second member towards the clutch through the outer race of a clutch release bearing. Therefore, any backlash in the clutch release mechanism has to be taken up on clutch release by the operator controlled release member which is disadvantageous. It is an object of the invention to provide an assembly which reduces that disadvantage.

According to one aspect of the invention there is provided a clutch and release bearing assembly comprising a first member operatively connected to releasing means of the clutch and having a screw threaded surface, a second member movable relative to the first member and being operatively connectable to an operator controlled release member, an element in threaded engagement with the first member and through which clutch release forces are transmitted from the second member to the first member, said element being prevented from rotating relative to the first member during clutch release, abutment means on the clutch for releasing the element when the second member reaches a predetermined position to allow the element to rotate relative to the first member thereby allowing the first member to move axially relative to the second member, and resilient means for urging the second member towards the clutch and which acts between the second member and means on the clutch.

With such an arrangement load can be applied directly to the second member rather than through an intermediate releasing mechanism.

Preferably, said means on the clutch is part of said abutment means.

The resilient means may be a tension spring having one end secured to the second member.

The abutment means may define a thrust surface for said element. The thrust surface may form a bearing surface which engages a face on the element.

The abutment means may define a surface for co-operation with said second member.

The abutment means may include an annular plate.

Preferably the abutment means includes a bearing member for co-operation with the collar. The aforesaid thrust surface may be formed on the bearing member and/or where the abutment means defines a surface for co-operation with said second member, said surface may be formed on the bearing member.

The bearing surface and the surface for co-operation with said second member are preferably spaced apart axially of the assembly.

The first and second members and said means on the clutch may be rotatable with the clutch.

Preferably locking means is provided between a surface on the element and a surface of the second member which locks the element against rotation relative to the first member during clutch release.

The use of such locking means is advantageous as it avoids the need to provide accurately machined co-operating cone-clutch surfaces as disclosed in GB No. 1544814.

In that respect and according to another aspect of the invention, there is provided a clutch and release bearing assembly comprising a first member operatively connected to release means of the clutch and having a screw threaded surface, a second member movable relative to the first member and being operatively connectable to an operator controlled release member and element in threaded engagement with the first member and through which clutch release forces are transmitted from the second member to the first member, said element being prevented from rotating relative to the first member during clutch release, abutment means on the clutch for releasing the element when the second member reaches a predetermined position to allow the element to rotate relative to the first member thereby allowing the first member to move axially relative to the second member, resilient means for urging the second member towqrds the clutch, and locking means provided between a surface on the element and a surface of the second member which locks the element against rotation relative to the first member during clutch release.

A resilient member may be arranged between said element and second member to assist in preventing the element rotating relative to the first member during clutch release. The resilient member may be an annular spring which is axially deformed into e.g. a wavy configuration.

The locking means is preferably radially movable and may comprise a snap ring, circlip or the like. The locking means may be of circular cross-section.

The said surface on the element and/or the surface of the second member may of frusto-conical form.

Preferably, the element is released following abutment of the element. Abutment of the element against said abutment means preferably releases the locking member.

According to a further aspect of the invention there is provided a clutch and release bearing assembly comprising a first member operatively connected to releasing means of the clutch and having a screw threaded surface, a second member movable relative to the first member and being operatively connectable to an operator controlled release member, an element in threaded engagement with the first member and through which clutch release forces are transmitted from the second member to the first member, said element being prevented from rotating relative to the first member during clutch release, abutment means on the clutch for releasing the element when the second member reaches a predetermined position to allow the element to rotate relative to the first member thereby allowing the first member to move axially relative to the second member and resilient means for urging the second member towards the clutch, said element being releasable following abutment of the element against said abutment means.

The second member in any previous aspect of the invention may be prevented from relative rotation with respect to the first member by a projection on one of the members engaged with a recess in the other of the members. Such a projection may be a peg or pin connected to the second member or the first member.

The invention will now be described by way of example with reference to the accompanying drawings of which:

BRIEF DESCRIPTION OF THE DRAWINGS

FIG. 2 is an enlarged partial view of the release bearing assembly of FIG. 1 showing the relative positions of some of the components when the clutch is fully released.

FIG. 3 is a view similar to that of FIG. 2 but showing the relative positions of some of the components when the clutch is in a partially engaged position;

DETAILED DESCRIPTION

Figure 1:
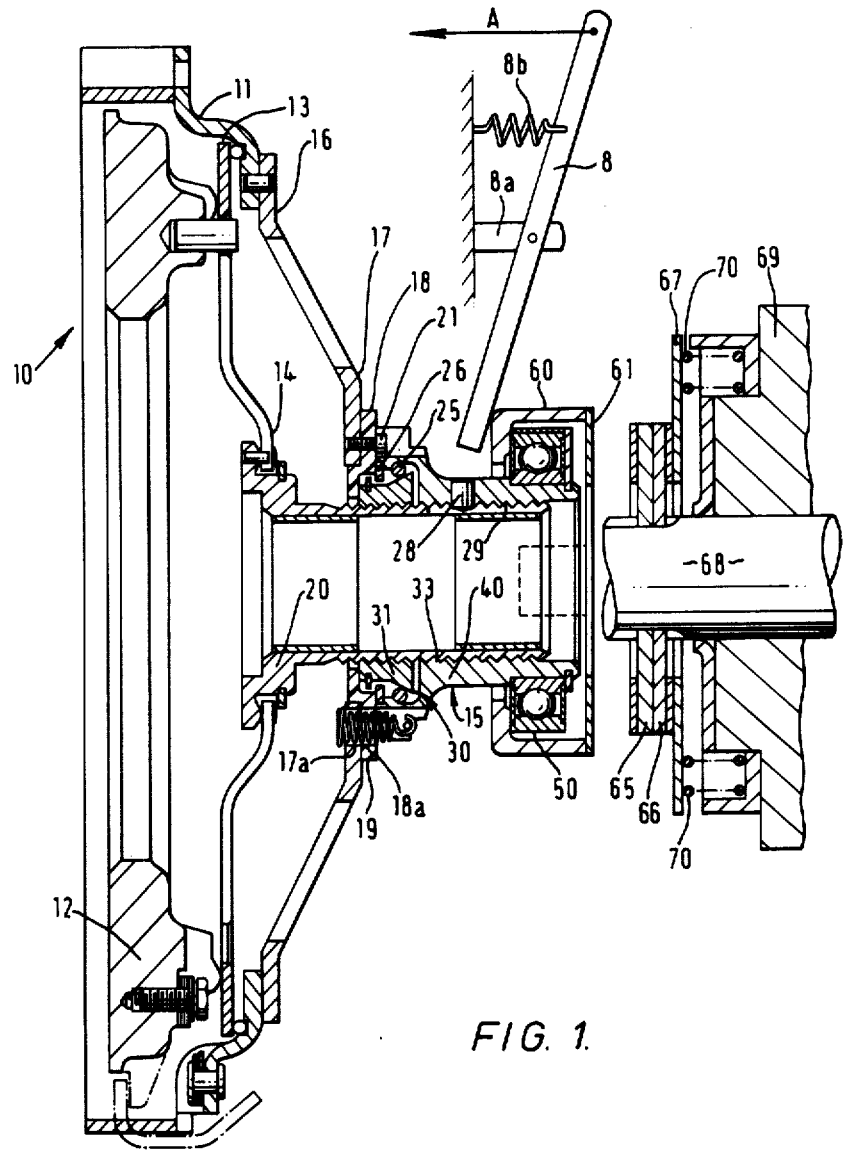
FIG. 1 is a cross-section through a pull-type diaphragm spring clutch assembly fitted with a release bearing assembly according to the invention.

With reference to the drawings there is shown a cover 11 of a clutch 10 for attachment to an engine flywheel (not show), and a pressure plate 11 biassed away from the cover 11 by a diaphragm spring 13 for engagement with a driven plate (not shown) interposed between the pressure plate 12 and the engine flywheel.

The diaphragm spring 13 has a plurality of radially inwardly extended fingers 14 around its periphery which are operative to reduce the biassing force on the pressure plate 12 when deflected away from the engine. The fingers 14 form a releasing mechanism which when pulled away from the engine flywheel release the clutch.

The fingers 14 are connected to an operator controlled release member such as a release lever or hydraulic slave cylinder (not shown) by a release bearing assembly 15.

The release bearing assembly 15 comprises a first sleeve 20 connected to the fingers 14 at one end and having a screw thread surface 33 for engagement with a threaded collar 30 and a second sleeve 40 arranged co-axially with the first sleeve 20 and being axially slidable relative thereto. The second sleeve 40 is operatively connectable to the operator controlled release member by a ball bearing 50. The threaded collar 30 is operatively connectable to the second sleeve 40 by a locking ring 25 operative in use to prevent relative rotation between the collar 30 and the first sleeve 20 during clutch release. The locking ring 25 is releasable by abutment means 16 connected to the clutch cover 11 when the second sleeve reaches a predetermined rest position.

The abutment means 16 includes an annular plate 17 fastened around its outer peripheral margin to the cover 11 and a thrust bearing member 18. The annular plate 17 is slightly dished away from the clutch and has a number of holes in it to reduce its mass and allow cooling air to reach the clutch.

The thrust bearing member 18 is made from a low friction wear resistant plastic material such as Nylon 66 and is connected to the annular plate 17 by a number of circumferentially spaced bolts 21. The thrust bearing member 18 is shaped to define two continuous annular abutment surfaces 22, 23 both facing away from the clutch and separated by a step 9.

The radially outer abutment surface 22 is positioned for co-operation with an end face 41 of the second sleeve 40 and the radially inner abutment surface 23 is positioned for co-operation with an annular face 37 on the collar 30, the abutment surfaces 22, 23 being axially offset from each other by a distance 'S' (FIG. 2).

The abutment means 16 is operative to allow rotation of the collar 30 relative to the first sleeve 20 thereby allowing the first sleeve 20 to move axially relative to the second sleeve 40. A return spring means in the form of a number of helical tension springs 19 is provided to ensure that in the clutch engaged condition the second sleeve 40 is held against the abutment means 16. Each spring 19 extends through aligned apertures 17a, 18a in the plate 17 and member 18 and is secured at its ends to plate 17 and outer sleeve 40 respectively.

A first engagement surface is formed on the collar 30 in the form of a frusto-conical surface 31, a second engagement surface is formed on the second sleeve 40 in the form of a frusto-conical surface 42 on an integral radially inwardly extending lip 43 and said locking ring 25 is arranged between the surfaces 31, 42. The locking ring is a radially movable annular snap ring of a circular cross-section.

The snap ring 25 is snap fitted into the bore of the second sleeve 40.

To bias the two frusto-conical surface 31, 42 against the snap ring 25 during clutch release, a locking spring in the form of a wavy washer 26 is provided between respective stops 44, 34 on the second sleeve 40 and the collar 30.

To prevent relative rotation between the second sleeve 40 and the first sleeve 20 a projection in the form of a pin 28, which is press fitted into the radially outer second sleeve 40, is arranged to engage with a longitudinal slot 29 in the radially inner first sleeve 20.

Adjustment of the release bearing assembly to compensate for wear in the clutch can best be understood with specific reference to figs. 2 to 5.

With reference to FIG. 2 the second sleeve 40 has been axially displaced away from the abutment means 16 by the effect of the operator controlled release member 8 such displacement being resisted by the fingers 14 and the helical return spring 19.

The release member is illustrated diagramatically as lever 8 pivoted on a fixed bracket 8a. The lever 8 is biased in the direction indicated at A by a spring 8b so that the lower end of the lever as shown urges the release bearing assembly 15 towards the release direction to take up any clearances, i.e. "backlash" in the clutch release mechanism. In that way, initial movement of the operator controlled lever 8 is not wasted in taking up backlash and the release mechanism will therefore respond instantly to such movement.

The axial thrust from the second sleeve 40 is transferred to the first sleeve 20 through the snap ring 25 and the collar 30. The effect of the axial thrust acting on the snap ring 25 is to wedge the snap ring 25 against the frusto-conical surface 42, rotation of the collar 30 relative to the first sleeve 20 is thereby prevented.

As the release member is moved to engage the clutch, the first and second sleeves 20, 40 and the collar 30 move in unison towards the clutch. As the release bearing assembly approaches the engaged position of the clutch the wavy washer 26 contacts the radially outer abutment surface 22 (FIG. 3).

The fact that the wavy washer 26 contacts the abutment surface 22 before the collar 30 contacts the radially inner abutment surface 23 ensures that the spring force produced by the wavy washer 26 is removed from the collar 30 before any adjustment of the release bearing assembly occurs.

Figure 4:
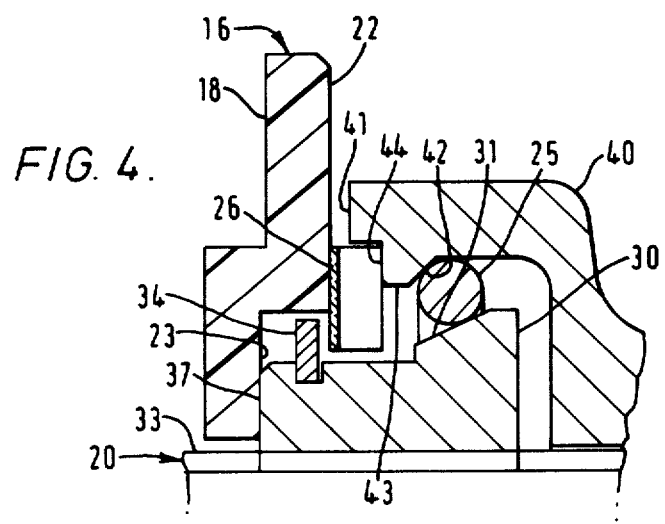
FIG. 4 is a view similar to that of FIG. 2 but showing the relative positions of some of the components when the clutch is approaching the fully engaged position.

Further movement in the clutch engaging direction brings the annular end face 37 of the collar 30 against the radially inner abutment surface 23 (FIG. 4). The first and second sleeves 20 and 40 and the collar 30 can now no longer move in unison as the collar 30 is prevented from movement by its abutment against the thrust bearing member 18.

Figure 5:
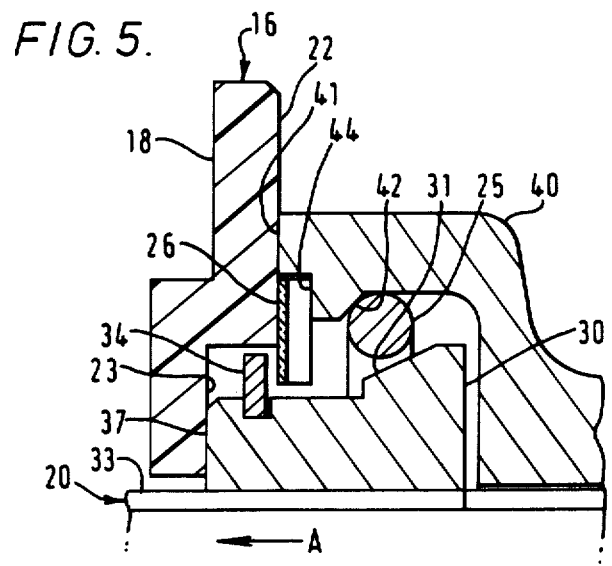
FIG. 5 is a view similar to that of FIG. 2 but showing the relative positions of some of the components when the clutch is in the fully engaged position.

The second sleeve 40 will continue to move further towards the clutch under the influence of the helical return springs 19 until the end face 41 contacts the outer abutment surface 22 (FIG. 5).

The relative axial movement between the second sleeve 40 and the collar 30 releases the snap ring thereby allowing the collar 30 to rotate under the influence of the returning force of the fingers 14 to take up any wear in the clutch. If there has been no wear the fingers 14 will be relaxed at approximately the same time as the engaging means is disengaged and will not therefore apply any returning force to the collar 30 to cause it to rotate.

In view of the fact that the spring 19 acts directly between the outer sleeve 40 and the plate 17, there is no spring bias on the clutch release bearing 50 in the clutch engagement direction as in GB No. 1544814 which could create backlash to be overcome by intial movement of lever 8 when releasing the clutch. The present invention is particularly advantageous in that respect.

As in GB No. 1544814 the ball bearing 50 is arranged within a housing 60 which carries an annular braking plate 61. A series of brake plates 65,66 and 67 are mounted coaxially with a drive input shaft 68 (part only of which is shown) of a gearbox 69. The drive input shaft is drivably connected to the driven plate of the clutch 10. The plate 67 is mounted on the gearbox 69 while the plates 65 and 66 are drivably connected to the shaft 68. The plate 67 is biassed towards the plates 65,66 by a spring 70 or a Belleville washer. If the clutch release lever 8 is moved sufficiently in direction A the braking plate 64 contacts the front brake pad 65 so that rotation of the shaft 68 is retarded.

Although the invention has so far been described with reference only to a pull release type of clutch it could be used for the push-release type of clutch.

Similarly, the material used for the thrust bearing is not limited to the specified material but could be any material that has sufficient strength and bearing properties.

The collar need not extend beyond the end face of the second radially outer sleeve, in which case, the abutment means would have axially extending portions to abut the collar.

Although the invention as described refers only to continuous annular contact between the abutment means and the collar the area of contact need not be annular or continuous, it is only necessary that a sufficiently large area is present to prevent premature wearing of the thrust bearing member.

Whilst the abutment means 16 is described as being fastened to the cover 11, the abutment means could be formed integrally with the cover.

I claim:

1. A clutch and release bearing assembly comprising a first member, operatively connected to releasing means of the clutch and having a screw threaded surface, a second member movable axially relative to the first member and being operatively connectable to an operator controlled release member, an element in threaded engagement with the first member and through which clutch release forces are transmitted from the second member to the first member, locking means to prevent said element from rotating relative to the first member during clutch release, abutment means on the clutch for releasing the locking means and element when the second member reaches a predetermined position to allow the element to rotate relative to the first member thereby allowing the first member to move axially relative to the second member, and resilient means for urging the second member axially towards the clutch and which acts between the second member and means on the clutch.

2. An assembly according to claim 1 in which said means on the clutch is part of said abutment means.

3. An assembly according to claim 1 in which the resilient means is a tension spring having one end secured to the second member.

4. An assembly according to claim 1, in which the resilient means maintains the second member in abutment with the abutment means when the clutch is engaged.

5. An assembly according to any claim 1 in which the abutment means defines a thrust surface for said element.

6. An assembly according to claim 5 in which said thrust surface forms a bearing surface which engages a face on the element.

7. An assembly according to claim 1 in which the abutment means defines a surface for co-operation with said second member.

8. An assembly according to claim 1 in which the abutment means includes an annular plate.

9. An assembly according to claim 1 in which the abutment means includes a bearing member for co-operation with a collar.

10. An assembly according to claim 9 and where the abutment means defines a thrust surface for said element, in which the thrust surface is formed on the bearing member.

11. An assembly according to claim 9 and where the abutment means defines a surface for co-operation with said second member, in which said surface is formed on the bearing member.

12. An assembly according to claim 7 in which the abutment means defines a thrust surface for said element and said thrust surface and the surface for co-operation with said second member are spaced apart axially of the assembly.

13. An assembly according to claim 1 in which the first and second members and said means on the clutch are rotatable with the clutch.

14. An assembly according to claim 1 in which the second member is prevented from relative rotation with respect to the first member by a projection extend on one of the members between and engaged with a recess in one of the the members.

15. An assembly according to claim 14 in which the projection is a peg connected to the second member.

16. A clutch and release bearing assembly comprising a first member operatively connected to releasing means of the clutch and having a screw threaded surface, a second member movable axially relative to the first member and being operatively connectable to an operator controlled release member, an element in threaded engagement with the first member and through which clutch release forces are transmitted from the second member to the first member, locking means to prevent said element from rotating relative to the first member during clutch release, abutment means on the clutch for releasing the locking means and element when the second member reaches a predetermined position to allow the element to rotate relative to the first member thereby allowing the first member to move axially relative to the second member, and resilient means for urging the second member towards the clutch, said locking means being provided between a surface on the element and a surface of the second member.

17. An assembly according to claim 16 in which a spring is arranged between said element and second member to assist in preventing the element rotating relative to the first member during clutch release.

18. An assembly according to claim 17 in which the spring is annular and is axially deformed into a wavy configuration.

19. An assembly according to claim 16 in which the locking means is radially movable.

20. An assembly according to claim 19 in which the radially movable locking means is a snap ring.

21. An assembly accordidng to claim 19 in which the locking means is of circular cross-section.

22. An assembly according to any of claim 16 in which the surface on the element is a frusto-conical surface.

23. An assembly according to claim 16 in which the surface of the second member is a frusto-conical surface.

24. An assembly according to claim 16 in which the element is released following abutment of the element against said abutment means.

25. An assembly according to claim 24 in which abutment of the element against said abutment means releases the locking member.

26. A clutch and release bearing assembly comprising a first member operatively connected to a releasing means of the clutch and having a screw threaded surface, a second member movable relative to the first member and being operatively connectable to an operator controlled release member, an element in threaded engagement with the first member and through which clutch release forces are transmitted from the second member to the first member, locking means to prevent said element from rotating relative to the first member during clutch release, abutment means on the clutch for releasing the locking means and element when the second member reaches a predetermined position to allow the element to rotate relative to the first member thereby allowing the first member to move axially relative to the second member and resilient means for urging the second member towards the clutch, said element being releasable following abutment of the element against said abutment means.

* * * * *